O. N. HART.

HOT AIR FURNACE.

No. 7,254. Reissued Aug. 8, 1876.

WITNESSES

H. L. Durand

P. McNickle.

INVENTOR

Orange N. Hart

By L. Deane.

Attorney

N. PETERS, PHOTO-LITHOGRAPHER, WASHINGTON, D. C.

UNITED STATES PATENT OFFICE.

ORANGE N. HART, OF WINONA, MINNESOTA, ASSIGNOR TO GEORGE T. FLINT, OF SAME PLACE.

IMPROVEMENT IN HOT-AIR FURNACES.

Specification forming part of Letters Patent No. 92,822, dated July 20, 1869; reissue No. 7,254, dated August 8, 1876; application filed June 8, 1876.

*To all whom it may concern:*

Be it known that I, ORANGE N. HART, of Winona, in the county of Winona and State of Minnesota, have invented certain new and useful Improvements in Hot-Air Furnaces; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
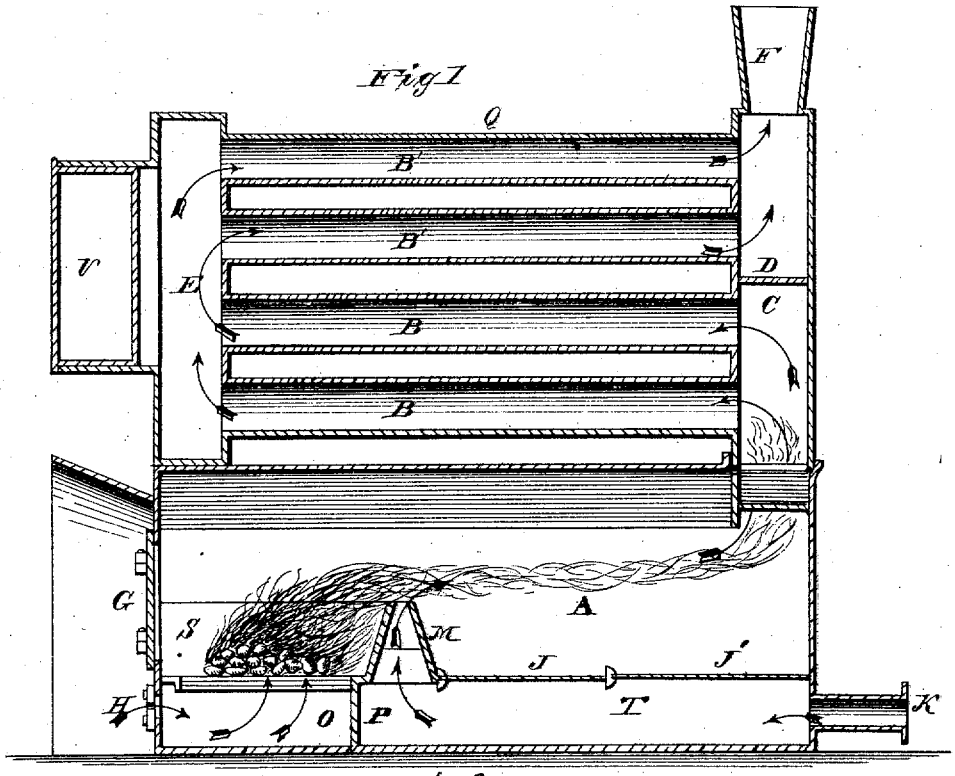
Figure 2:
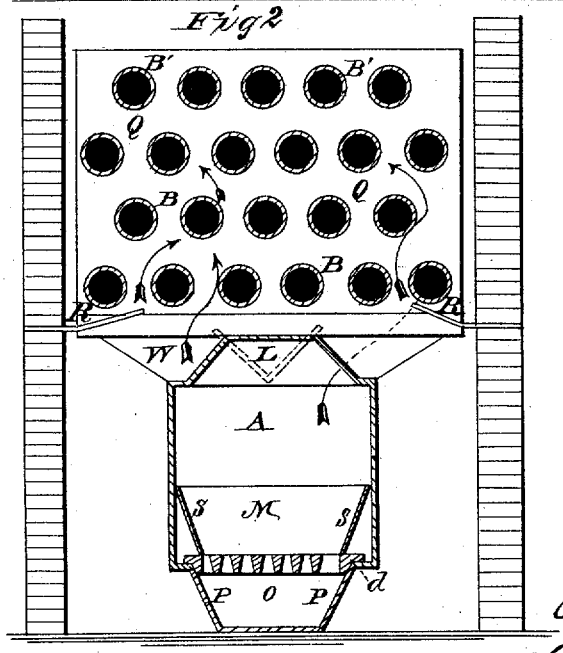

Figure 1 is a vertical central section from front to rear. Fig. 2 is a vertical cross-section on the lines *x x* of Fig. 1.

My invention relates to hot-air furnaces for heating buildings; and consists in the novel construction of the smoke-flues and heating-drum, and combination thereof with the fire-chamber, whereby a large and effective heat-radiating surface is obtained; and of the gas-burning apparatus, by which it is adapted to burning various kinds of fuel; also, in placing deflectors to direct the air in and among the smoke-flues; and in several minor details, all as herein described.

The fire-chamber A is made of any suitable form and size, and is provided with grate *a*, to which access may be had through door G. The usual draft and door opening into ash-pit O is found at H. Across the fire-box, immediately in the rear of the grate, I locate a gas-burning device, M, resting on the ledges *d*, and along the upper sides of the grate *a* place fire-plates S, to prevent the case from being burned out, and so as to admit the passage of air up behind them. Back of the gas-burning device I locate removable plates J J′, resting on the ledges *d*, so as to extend from the gas-burner to the back end of the furnace, and divide off from the fire-box A a cold-air chamber, T. This cold-air chamber T is separated from the ash-pit by a vertical plate, P, and receives air through a pipe, K.

The gas-burner is of the form of an inverted V, with its lower side communicating with the cold-air chamber T, and is provided with a fine slit or opening along its upper edge, as shown in Fig. 1.

At the back end of the fire-box I provide an escape-flue, W, for the passage of the flame and smoke. This flue is usually made increasing in width from the fire-box upward, and its upper end would thus be somewhat wider than the fire-box. In the center of this may be placed the V-shaped diaphragm L, to divide the ascending flames.

The drum Q may be adjusted or attached to the flue W at the top and rear of the fire-box, and rest upon the fire-chamber in front, and consists of chambers C E at either end, connected by horizontal flues or pipes B B′. In the chamber C the partition or diaphragm D, placed about midway from top to bottom, constitutes the division-strip, to deflect the escaping products of combustion into the lower series B of said pipes. The draft therein, flowing into chamber E at the opposite end of the drum, escapes, by the upper and return flues B′, into C above the partition D, and out of the exit-pipe. A suitable clear-out opening for the drum is afforded by the door or other convenient means at U. The furnace is set in any convenient brick or metal casing, in the usual way, and the customary attachment of pipes provided to carry heat to different apartments. On the inside of the brick-work, a little below the lower flues B, I secure inwardly-projecting plates R, inclining upward from their outer to their inner edges, as shown in Fig. 2. These plates extend along both sides, and cross the back of the furnace.

When the furnace is situated where the air is very damp I draw the air to be heated through one or more pipes entering the brick-work, near the floor, from outside the building. When located where the air is sufficiently dry I form a series of openings through the brick-work near the floor, and use air from the surrounding room.

When short wood or coal is to be used as fuel the gas-burner is arranged as shown in the drawing; but when longer wood is used the burner is moved back, and placed between the plates J and J′, the plate J being moved forward against the grate, or, when necessary, (as in using very long wood,) may be placed back of both plates, thus always letting in the cold air just where the flame leaves the fuel, it being necessary, when the gas-burner is moved back, to add additional fire-plates S; or, if preferred, additional sections of grate-bars may be substituted for the plates in front of the gas-burner when the latter is moved back.

A furnace constructed in this manner presents a very large radiating-surface, will burn various sizes and kinds of fuel, and is so arranged that all its parts may be easily reached for cleaning.

Having thus described my invention, what I claim is—

1. The combination of drums C, E, B, and B′, having division-partition D, and constructed and arranged as described, with the fire-chamber of a furnace or heater, substantially in the manner and for the purposes set forth.

2. In the furnace A, the adjustable gas-burner M, combined with the fire-box and plates J J′ and air-duct T, substantially as and for the purposes set forth.

3. In combination with a drum and furnace, substantially as described, the deflector L, arranged in the exit-flue W, as and for the purposes set forth.

In testimony that I claim the foregoing I have hereunto set my hand this 15th day of May, 1876.

O. N. HART.

Witnesses:
R. R. BRIGGS,
E. R. HART.